March 5, 1968 M. A. KEYES 3,371,518
DEVICE FOR CONTINUOUSLY MEASURING POROSITY
Filed Feb. 12, 1965
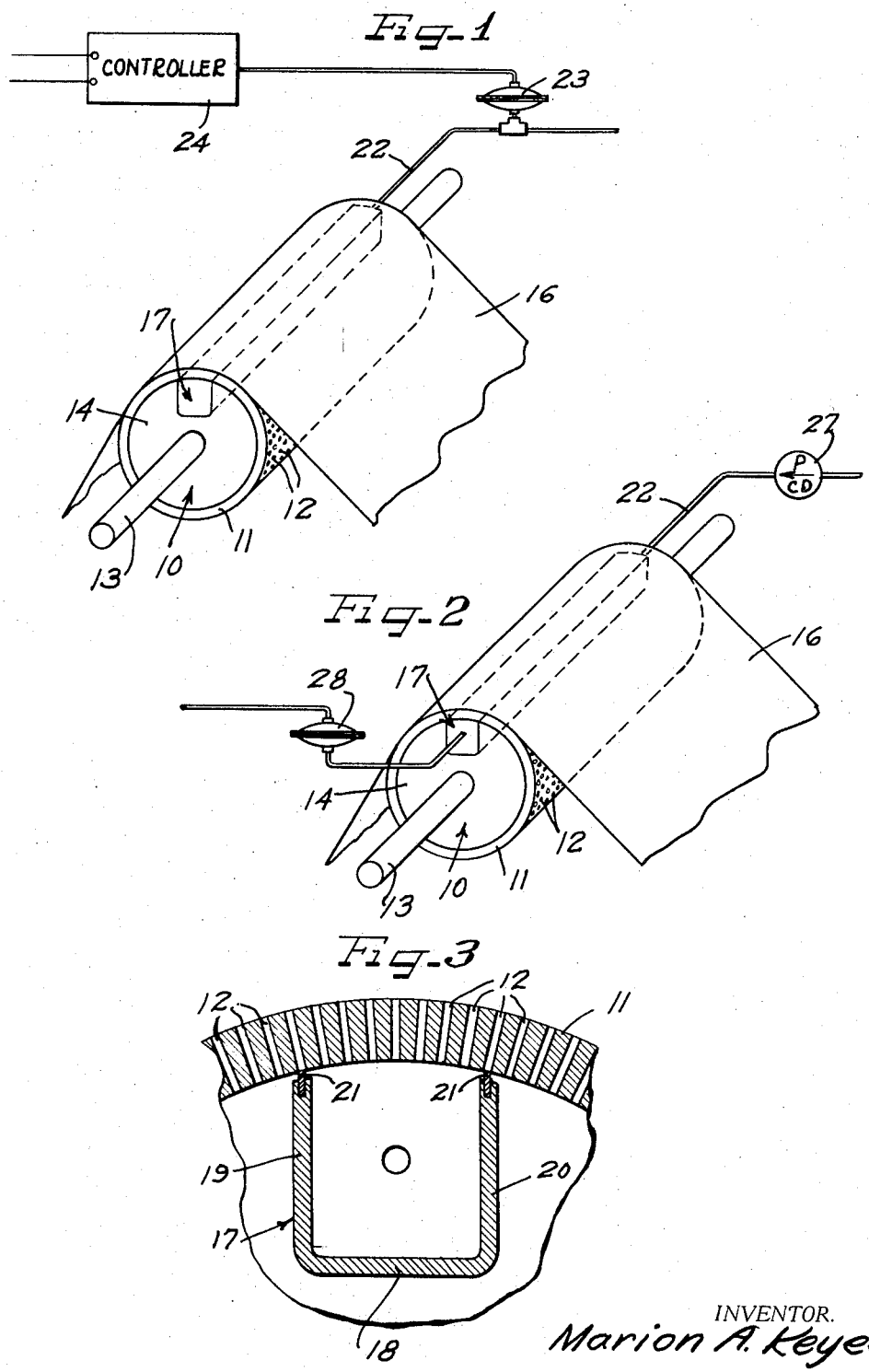
INVENTOR.
Marion A. Keyes
BY Hill, Sherman, Meroni, Gross & Simpson
ATTORNEYS

United States Patent Office 3,371,518
Patented Mar. 5, 1968

3,371,518
DEVICE FOR CONTINUOUSLY
MEASURING POROSITY
Marion A. Keyes, South Beloit, Ill., assignor to Beloit
Corporation, Beloit, Wis., a corporation of Wisconsin
Filed Feb. 12, 1965, Ser. No. 432,328
5 Claims. (Cl. 73—38)

ABSTRACT OF THE DISCLOSURE

Continuous measurement of porosity of a moving porous web wherein the web is passed over an air chamber thereby subjecting it to a pressure differential, and sensing either the air flow through the web or changes in pressure in the chamber as an indication of variations in porosity, which changes can then be translated into a control signal for controlling process variables which affect the porosity.

---

The present invention relates to a method and apparatus for continuously measuring porosity of permeability to air transmission of continuously moving webs, such as paper webs.

In the usual systems for the physical testing of paper, air permeability is measured on a pre-cut sample in the testing laboratory. In most permeability measuring instruments, air is forced through the paper by reason of a small difference in air pressure at the two faces of the sheet, the pressure difference being held constant. In such permeability measuring instruments, a measurement is made of the volume of air that is forced through a given area of the paper in a given time, or of the time required to force a given volume through the specimen. The volume of air is measured in some form of measuring flask or gasometer which is part of the instrument, and a stop watch is generally used to measure the time. Probably the most familiar instrument of this type is the Gurley permeability tester which utilizes a bell or cylinder of aluminum operating in a seal of mineral oil so that as it descends, it forces air through a specially mounted specimen of paper. The volume of air displaced through the specimen is measured by the amount the bell sinks. The usual test consists of determining the time in seconds required to displace 100 cc. of air through 1 square inch of paper under a pressure head fixed by the weight and dimensions of the bell. The result obtained, which is inversely related to air permeability, is referred to as the air resistance.

The present invention provides a means for continuously monitoring changes in permeability of the paper web during its formation, so that corrections can be made directly on the machine to adjust for deviations from the desired permeability.

One of the objects of the present invention is to provide a continuously operable sensing device for measuring permeability to air in a moving web of paper or other relatively porous material.

Another object of the invention is to provide a method for producing an error signal which can be used in an automated control system to control operating parameters in a papermaking process.

Another object of the invention is to provide an improved device for continuously monitoring the permeability of porosity of a paper web directly on the papermaking machine.

Still another object of the invention is to provide a method for immediately sensing changes in permeability of a paper web and automatically compensating for such changes.

In accordance with the present invention, the permeability of a moving porous web is continuously monitored by passing the web across the open end of an open ended air chamber, and sensing a parameter dependent upon air flow through the web to thereby indicate changes in the permeability of the web.

A further description of the present invention will be made in conjunction with the attached sheet of drawings in which:

FIGURE 1 is a somewhat schematic view in perspective of an assembly which operates to detect changes in permeability of a traveling web under conditions of constant air pressure;

FIGURE 2 is a view in perspective of a modified form of the present invention in which the changes in permeability are detected under conditions of constant air flow; and FIGURE 3 is a greatly enlarged, fragmentary cross-sectional view of a type of box and roll assembly which can be employed with the embodiments illustrated in FIGURES 1 and 2 of the drawings.

As shown in the drawings:

In FIGURE 1, reference numeral 10 indicates generally a metering roll or similar structure consisting of a hollow roll 11 having spaced rows of apertures 12 on the periphery thereof. The roll 11 is mounted on a shaft 13 which has a pair of end plates 14 secured thereto and closing off the ends of the hollow roll 11, the roll 11 being rotatable relative to the end plates 14. A web 16 of paper or similarly permeable material is shown being drawn over the roll 11 in a right to left direction as viewed in FIGURE 1.

An air pressure differential is established across the moving web 16 by providing a suction or pressure box 17 which is held stationary with respect to the movement of the roll 11 and is best shown in the enlarged view of FIGURE 3 of the drawings. As seen in that figure, the box 17 is of open ended construction, having a bottom wall 18 and a pair of side walls 19 and 20 extending therefrom. A sealing engagement is made with a rotating roll 11 by providing a pair of resilient sealing strips 21 which ride against the inner periphery of the roll 11. The box 17 is communicated to a source of sub-atmospheric or super-atmospheric pressure by means of a line 22. The source of constant pressure, whether it be reduced pressure or a positive pressure, keeps the interior of the box 17 at a predetermined air pressure, so that a predetermined air pressure differential appears across the thickness of the moving web 16. When the permeability of the web 16 changes, however, due to any of a number of factors, the flow of air through the web 16 changes, and this change is sensed by a valve 23 located in the inlet line 22 supplying the controlled pressure to the interior of the box 17. The valve 23, which may be of the diaphragm type, actuates a flow indicating or recording controller 24 which translates the mechanical movement of the valve diaphragm into an electrical signal. This signal can be used to control a process variable in the refining operation, the stock composition, and other parameters which contribute to changes in porosity in the paper web. At the same time, the signal may be used to operate a recorder which reflects the change of permeability by direct conversion to Gurley units. The conversion equation for this purpose, under conditions of constant box pressure, is set forth below:

$$1/\text{Porosity (Gurley)} = K_1(\text{air flow})$$

where $K_1$ is a constant

The above relationship assumes laminar flow of air through the web. If this condition should not exist, suitable adjustment of the equation form can be made.

The embodiment of FIGURE 2 is similar structurally to that shown in FIGURE 1, and corresponding reference numerals have been applied where appropriate. In this case, however, the system is operated under conditions of constant air flow, with the inlet line 22 being connected to a constant delivery pump 27 which supplies air at a constant volumetric rate to the box 17. The air pressure within the box 17 is then a measure of the sheet permeability or porosity. Changes in this value can be detected by the provision of a diaphragm type valve 28 communicating with the interior of the box 17, and then translated into suitable electrical signals for modifying the papermaking conditions and restoring the desired porosity. In this case of constant air flow, the corresponding equation to convert the pressure figures into porosity figures is given below:

$$1/\text{Porosity (Gurley)} = K_2(\text{box pressure})$$

where $K_2$ is a constant

The devices of the present invention permit integration of porosity as a directly controlled parameter in a paper machine operation. Devices of this nature are particularly valuable in process control computer applications.

It should be evident that various molifications can be made to the described embodiments without departing from the scope of the present invention.

I claim as my invention:

1. A permeability monitoring system comprising a hollow rotatable roll having rows of peripherally spaced apertures thereon, a stationary air chamber confined within said roll and communicating with some of the apertures in said rows, control means for supplying said air chamber with air under substantially constant pressure, and means for sensing changes in said control means caused by variations in the air flow as a web passes across said air chamber due to changes in permeability of said web.

2. The system of claim 1 in which the air is supplied to said air chamber under super-atmospheric pressure.

3. The system of claim 1 in which the air is supplied to said air chamber under sub-atmospheric pressure.

4. A permeability monitoring system comprising a rotatable roll having rows of peripherally spaced apertures therein, a stationary open ended box positioned in said roll in fluid communication with some of said apertures, control means for supplying said air chamber with air under substantially constant pressure, and means for sensing changes in said control means caused by variation in the air flow as a web passes across said air chamber due to changes in permeability of said web.

5. A permeability monitoring system comprising a hollow rotatable roll having rows of peripherally spaced apertures thereon, means providing a stationary air chamber within the interior of said roll communicating with some of said apertures, control means for introducing air to said chamber at a substantially constant rate, and means sensing changes in the air flow rate to said chamber to thereby detect variations in permeability of a porous web as it is drawn across the periphery of said roll.

References Cited
UNITED STATES PATENTS

| | | | |
|---|---|---|---|
| 2,438,696 | 3/1948 | Fox et al. | 73—38 |
| 2,861,451 | 11/1958 | Emmons | 73—38 |

LOUIS R. PRINCE, *Primary Examiner.*

WILLIAM HENRY, *Assistant Examiner.*